United States Patent
Pallardy et al.

(10) Patent No.: US 11,614,949 B2
(45) Date of Patent: Mar. 28, 2023

(54) METHOD AND DEVICE FOR MANAGING OPERATION OF A COMPUTING UNIT CAPABLE OF OPERATING WITH INSTRUCTIONS OF DIFFERENT SIZES

(71) Applicants: STMicroelectronics (Grand Ouest) SAS, Le Mans (FR); STMicroelectronics (Grenoble 2) SAS, Grenoble (FR)

(72) Inventors: Loic Pallardy, Rouillon (FR); Ignazio Antonino Urzi, Voreppe (FR); Jean-Francis Duret, St Paul de Varces (FR)

(73) Assignees: STMicroelectronics (Grenoble 2) SAS, Grenoble (FR); STMicroelectronics (Grand Ouest) SAS, Le Mans (FR)

( * ) Notice: Subject to any disclaimer, the term of this patent is extended or adjusted under 35 U.S.C. 154(b) by 245 days.

(21) Appl. No.: 16/899,327

(22) Filed: Jun. 11, 2020

(65) Prior Publication Data
US 2020/0394047 A1    Dec. 17, 2020

(30) Foreign Application Priority Data
Jun. 13, 2019  (FR) ...................................... 1906337

(51) Int. Cl.
  *G06F 13/40*    (2006.01)
  *G06F 9/4401*   (2018.01)
  *G06F 9/30*     (2018.01)
  *G06F 9/345*    (2018.01)
  *G06F 9/445*    (2018.01)

(52) U.S. Cl.
  CPC .......... *G06F 9/441* (2013.01); *G06F 9/30047* (2013.01); *G06F 9/30149* (2013.01); *G06F 9/345* (2013.01); *G06F 9/44505* (2013.01)

(58) Field of Classification Search
  None
  See application file for complete search history.

(56) References Cited

U.S. PATENT DOCUMENTS

| | | | |
|---|---|---|---|
| 5,638,525 A | 6/1997 | Hammond et al. | |
| 7,149,878 B1 | 12/2006 | Jensen et al. | |
| 2004/0268114 A1* | 12/2004 | Kobayashi | G06F 3/1285 713/2 |
| 2009/0222650 A1* | 9/2009 | Chen | G06F 9/4401 713/1 |
| 2012/0030371 A1* | 2/2012 | Baptist | H04L 67/51 709/236 |

(Continued)

OTHER PUBLICATIONS

Liang, B.-S., et al., "Instruction Set Architecture Scheme for Multiple Fixed-width Instruction Sets and Conditional Execution," VLSI Design Automation and Test International Symposium on Hsinchu Taiwan, Apr. 27-29, 2005, Piscataway, NJ, pp. 325-328.

*Primary Examiner* — Hyun Nam
(74) *Attorney, Agent, or Firm* — Slater Matsil, LLP (57) ABSTRACT

An integrated circuit comprises a processing unit configured for booting up with a set of boot instructions, then for determining the size of the instructions of an application programme and potentially rebooting on its own initiative, while being reconfigured, in order for it to execute the instructions of the application program. Only one boot memory is needed as a consequence.

22 Claims, 6 Drawing Sheets

(56) References Cited

U.S. PATENT DOCUMENTS

| | | | |
|---|---|---|---|
| 2012/0216242 A1* | 8/2012 | Uner | G06F 21/51 |
| | | | 726/1 |
| 2012/0284461 A1* | 11/2012 | Larin | G06F 9/30178 |
| | | | 712/205 |
| 2013/0205115 A1* | 8/2013 | Tabony | G06F 9/30189 |
| | | | 712/E9.034 |
| 2016/0048693 A1* | 2/2016 | Üner | G06F 21/604 |
| | | | 713/189 |
| 2017/0249156 A1* | 8/2017 | Frey | G06F 9/441 |

* cited by examiner

METHOD AND DEVICE FOR MANAGING OPERATION OF A COMPUTING UNIT CAPABLE OF OPERATING WITH INSTRUCTIONS OF DIFFERENT SIZES

CROSS-REFERENCE TO RELATED APPLICATIONS

This application claims the benefit of French Patent Application No. 1906337, filed on Jun. 13, 2019, which application is hereby incorporated herein by reference.

TECHNICAL FIELD

Various embodiments of the invention and their implementation relate to integrated circuits and, more particularly, an integrated circuit forming a system on a chip known to those skilled in the art as a System-on-a-Chip (or SoC).

BACKGROUND

A System-on-a-Chip comprises a processing unit and a non-volatile boot memory comprising instructions for booting up the processing unit.

Processors exist that are capable of operating just as easily according to different modes of operation, each mode of operation being defined by the size of the instructions, for example 32 bits or 64 bits.

Such a processor is therefore capable of executing application programs coded over 32 or 64 bits.

Currently, a System-on-a-Chip incorporating such a processor also incorporates a co-processor.

When the System-on-a-Chip is booted up, only the co-processor starts up and executes instructions coded over a single and fixed size, for example 32 bits, the processor remaining in a reset state.

The co-processor then loads the code of the application program into a program memory and identifies the size of the instructions.

Then, the co-processor configures the processor accordingly and boots it up with boot-up instructions having the identified size.

However, the implementation of a co-processor and of the associated peripherals requires a significant surface area on the silicon, leads to an additional electrical power consumption of the System-on-a-Chip, and is not adapted to a System-on-a-Chip of reduced size.

Another possible solution consists in using two systems on different chips having respectively two boot memories over 32 and 64 bits.

Such a solution avoids the use of a co-processor but requires the use of two systems on a chip.

There thus exists a need to reduce the complexity and the energy consumption of an integrated circuit or System-on-a-Chip comprising a processing unit such as a microprocessor capable of operating and of booting up according to a set of instructions chosen from amongst several sets of instructions of different sizes.

SUMMARY

According to embodiments and their implementation, the use is advantageously provided of the processing unit itself, designed to execute an application program, for determining the conditions of its operation according to the size of the coding of the application program, and the use of the processing unit in such a manner that it configures itself for potentially controlling its own reboot in such a manner as to go and search within a program memory for the instructions of the application program.

According to one aspect, a method is provided for managing the operation of a processing unit designed to execute an application program coded with instructions that may have different reference sizes, for example 32 or 64 bits, the method comprising: boot up of the processing unit with a set of boot instructions having a size, for example 32 bits, taken from between the reference sizes; delivery to the processing unit of a selection signal denoting the reference size of the said instructions of the application program; and in the case where the reference size denoted by the selection signal is different from the size of the boot instructions, generation by the processing unit of a reboot command and reconfiguration and reboot of the processing unit based on this reboot command in order for it to execute the instructions of the application program.

The processing unit is therefore configured for booting up with a set of instructions having a default size (fixed size), then for determining the size of the instructions of the application program and potentially rebooting of its own accord while reconfiguring itself so as to execute the instructions of the application program.

This reboot command notably allows registers of the processing unit to be reset and contains, in particular, a memory address of the instructions of the application program allowing the processing unit to point to this address for rebooting by executing the instructions of the application program.

In other words, at the first boot up (or "cold" boot) of the processing unit coinciding with the boot up of the System-on-a-Chip, the processing unit executes the boot instructions contained in the boot memory, then upon a reboot (in other words a later local boot up or "hot" boot) of the processing unit (the System-on-a-Chip itself does not boot up because it has not been reset), the reconfigured processing unit executes the instructions of the application program.

For this reason, no co-processor is needed to carry out this management of the processing unit (microprocessor).

The processing unit is generally connected to a bus.

Accordingly, according to one embodiment, the reconfiguration and the reboot of the processing unit, with a view to the execution of the instructions of the application program, are carried out in response to the reboot command generated by the processing unit and when both the following conditions are met: no data is being transferred over the bus, and the processing unit is not executing any operation.

This avoids fictitious data being transferred over the bus when the processing unit is rebooted.

According to another embodiment, the method comprises an execution of the application program by the processing unit, without rebooting the processing unit, in the case where the reference size denoted by the selection signal is the size of the boot instructions.

However, even in the case where the reference size denoted by the selection signal is the size of the boot instructions, it is possible to perform a reboot of the processing unit with a view to the execution of the instructions of the application program, in response to a reboot command generated by the processing unit and when both the following conditions are met: no data is being transferred over the bus, and the processing unit is not carrying out any operation.

Thus, here again, fictitious data being transferred over the bus is avoided when the processing unit is rebooted.

According to one embodiment, when the processing unit is associated with a cache memory, the reboot of the processing unit is carried out when the cache memory is furthermore inactive.

Fictitious data being stored in the cache memory when the processing unit is rebooted is thus avoided.

According to one embodiment, the selection signal comprises a digital word or a header of the said application program for example copied from an SD card.

The digital word may for example be stored in a register of the one-time-programmable (OTP) type, or else be delivered to an input of the integrated circuit by a user.

Although it is possible to provide more than two reference sizes, the processing unit is, in general, designed to execute the application program coded with instructions able to have two different reference sizes.

The two reference sizes are respectively equal to 32 bits and 64 bits, for example.

According to another aspect, an integrated circuit, or System-on-a-Chip, is provided comprising: a program memory configured for storing instructions of an application program able to have different reference sizes, a boot memory means configured for storing a set of boot instructions having one of the reference sizes, a processing unit designed to execute the said application program and configured for receiving a selection signal denoting the reference size of the said instructions of the application program, and control means configured for booting up the processing unit with the set of boot instructions, and in the case where the reference size denoted by the selection signal is different from the size of the boot instructions, receiving a reboot command delivered by the processing unit and reconfiguring and rebooting the processing unit using this boot command in order for it to execute the instructions of the application program.

According to one embodiment, the integrated circuit furthermore comprises a bus connected to the processing unit, and the control means are configured for reconfiguring and rebooting the processing unit in order for it to execute the instructions of the application program in response to the said reboot command generated by the processing unit and when both the following conditions are met: no data is being transferred over the bus, and the processing unit is not carrying out any operation.

According to another embodiment, the processing unit is configured for executing the application program with no prior reboot, in the case where the reference size denoted by the selection signal is the size of the boot instructions.

According to yet another embodiment, the integrated circuit furthermore comprises a bus connected to the processing unit, and the control means are configured for reconfiguring and rebooting the processing unit in order for it to execute the instructions of the application program in the case where the reference size denoted by the selection signal is the size of the boot instructions in response to a reboot command generated by the processing unit and when both the following conditions are met:no data is being transferred over the bus, and the processing unit is not carrying out any operation.

According to yet another embodiment, when the integrated circuit furthermore comprises a cache memory associated with the processing unit, the control means are configured for reconfiguring and rebooting the processing unit when the cache memory is furthermore inactive.

According to yet another embodiment, the processing unit comprises a reset pin, and the control means comprise a reset controller configured for delivering a boot signal on the said pin so as to boot up the processing unit with, by default, the set of boot instructions.

According to yet another embodiment, the control means comprise a reboot stage configured for delivering a reboot signal onto the said reset pin in response to the reboot command generated by the processing unit and when all the said conditions (aforementioned) are met.

According to yet another embodiment, the reboot stage comprises a logic circuit configured for receiving the said reboot command and input signals corresponding to the said conditions and for delivering the reboot signal onto the said reset pin.

According to yet another embodiment, the control means are configured for delivering to the processing unit, when it is rebooted, a first indication representative of the reference size denoted and a second indication representative of the storage address of the instructions of the application program.

According to yet another embodiment, the control means comprise a first memory one-time-writable after each boot up (in other words after each "cold" boot) and intended to contain the first indication, and a second memory designed to store the second indication, and the processing unit is configured for storing these two indications in the two respective memories with a view to a reboot.

According to yet another embodiment, the integrated circuit comprises an auxiliary memory designed to store a digital word representing the selection signal.

According to yet another embodiment, the processing unit is configured for reading a header of the application program forming the said selection signal.

According to yet another embodiment, the integrated circuit comprises a communications interface designed to receive the selection signal.

According to yet another embodiment, the processing unit is designed to execute the application program coded with instructions able to have two different reference sizes.

Preferably, the two reference sizes are respectively equal to 32 bits and 64 bits.

According to another aspect, an apparatus is provided incorporating an integrated circuit such as defined hereinabove.

BRIEF DESCRIPTION OF THE DRAWINGS

Other advantages and features of the invention will become apparent upon examining the detailed description of non-limiting embodiments and from the appended drawings in which.

DETAILED DESCRIPTION OF ILLUSTRATIVE EMBODIMENTS

Figure 1:
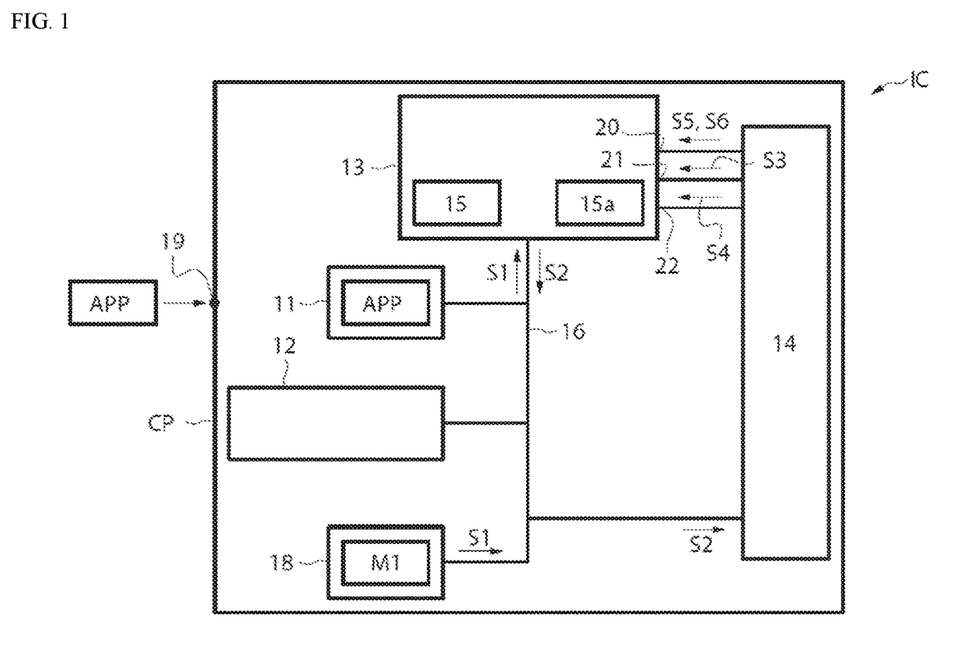
FIGS. 1-6 illustrate various embodiments and implementations of the invention.

Reference is made to FIG. 1 which shows one example of an embodiment of an integrated circuit IC, incorporated within an electronic apparatus CP, for example a tablet.

The integrated circuit IC here forms a System-on-a-Chip ("SOC") and comprises: a program memory 11 configured for storing instructions of an application program APP able to have instructions of different reference sizes, a boot memory means 12 configured for storing a set of boot instructions having one of the reference sizes, the size of the boot instructions being fixed, a processing unit 13, for example a microprocessor, designed to execute the said application program and configured for receiving a selection signal S1 denoting the reference size of the said instructions of the application program, and control means 14 whose structure and functionality will be described hereinafter.

The processing unit 13 here comprises at least one cache memory 15 (the latter being optional) and at least one processing core 15a.

It goes without saying that the processing unit 13 may comprise several cache memories and/or several processing cores.

For the sake of simplification, it is assumed that the processing unit 13 is designed to execute the application program APP coded with instructions able to have two different reference sizes, for example reference sizes respectively equal to 32 bits and 64 bits.

The boot memory means comprises, for example, a non-volatile memory storing the set of boot instructions for example coded over 32 bits.

As a variant, the reference size of the set of boot instructions may be equal to 64 bits.

However, irrespective of the size of the instructions of the application program, the integrated circuit only comprises a single boot memory 12 storing a single set of boot instructions coded over a fixed number of bits.

The integrated circuit IC furthermore comprises a bus 16 connected to the processing unit 13, to the program memory 11, to the boot memory means 12, to the control means 14 and to an auxiliary memory 18 here intended to store a digital word M1 representing the selection signal S1.

The integrated circuit IC furthermore comprises a loading interface 19 for loading the application program APP into the program memory 11 of the volatile memory type during the execution of the boot instructions of the integrated circuit IC.

The control means 14 are configured for booting up the processing unit 13 with the set of boot instructions during the initial boot up of the integrated circuit, in other words during the very first boot up (referred to as "cold" boot) of the processing unit.

The later start-ups of the processing unit, while the integrated circuit, or System-on-a-Chip, is already booted up, are "hot" boots and are also referred to as "reboots".

The control means 14 are furthermore configured for receiving a reboot command S2 delivered by the processing unit 13 notably in the case where the reference size denoted by the selection signal S1 is different from the size of the boot instructions.

In response to the reboot command generated by the processing unit 13 and when: a) no data is being transferred over the bus 16, b) the cache memory 15 is inactive, and c) the processing unit 13 is not carrying out any operation, in other words when the processing core 15a is not carrying out any operation, the control means 14 are configured for reconfiguring and rebooting the processing unit 13 in order for it to execute the instructions of the application program APP. This reboot command contains: a first indication S3 representative of the denoted reference size, and a second indication S4 representative of the storage address in the program memory 11 of the instructions of the application program APP.

In the case of a cold boot, the processing unit 13 executes the boot instructions stored from an initial address in the boot memory 12. This initial address is communicated by the signal S4.

The aforementioned conditions a), b) and c) allow the processing unit 13 to be rebooted in such a manner as to avoid fictitious data being transferred over the bus 16 or being stored in the cache memory 15.

If the reference size denoted by the selection signal S1 is the size of the boot instructions, the processing unit 13 may be configured for executing the application program APP without a prior reboot.

However, even if the reference size denoted by the selection signal S1 is the size of the boot instructions, a reboot of the processing unit is possible.

In other words, the control means are then configured for rebooting the processing unit 13 with the instructions of the application program in response to a reboot command generated by the processing unit 13 and, if the aforementioned reboot conditions a), b) and c) are met, in other words if no data is being transferred over the bus 16, the cache memory 15 is empty, and the processing unit 13 is not carrying out any operation. After the reboot, the processing unit 13 executes the application program APP.

The control means 14 are furthermore connected to: a reset pin 20 of the processing unit 13 designed to receive a boot signal S5 or a reboot signal S6, a pin 21 for indicating the denoted reference size designed to receive the signal S3 representative of the denoted reference size, and an addressing pin 22 designed to receive the signal S4 representative of the storage address in the program memory 11 of the instructions of the application program APP or of the initial address for storage of the set of boot instructions in the boot memory 12.

Figure 2:
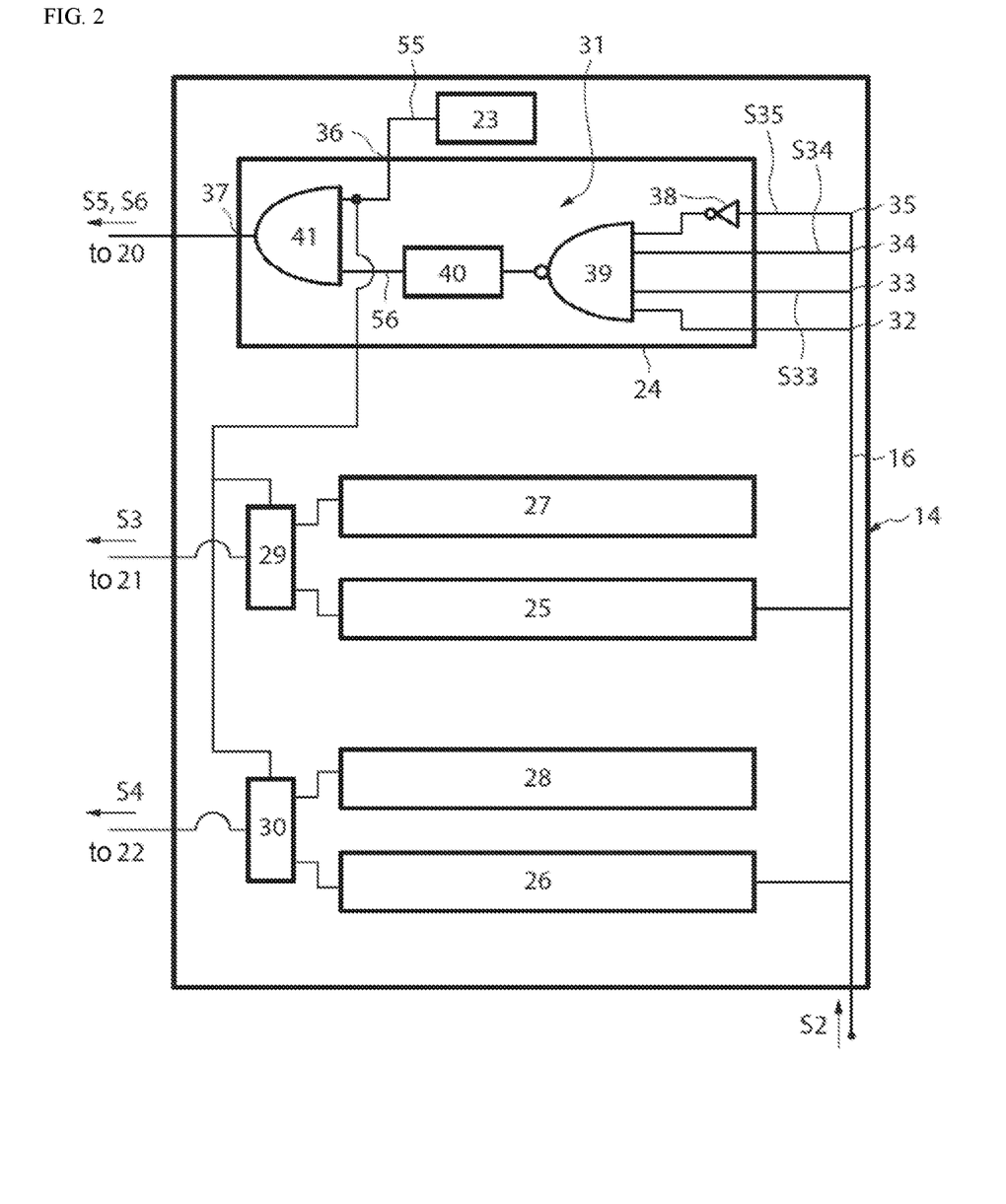

FIG. 2 illustrates one exemplary embodiment of the control means 14.

The control means 14 comprise a reset controller 23 of conventional structure, a reboot stage 24, a first memory 25 one-time-writable after each boot up and a second memory 26, connected to the bus 16.

The reset controller 23 is configured for delivering the boot signal S5 onto the pin 20 so as to boot up the processing unit 13 with the set of boot instructions, during a "cold" boot.

The first memory 25 is implemented for example based on a register controlled by a state machine and a logic circuit which, after a reboot, prevent a new writing in the register for as long as a new boot up of the processing unit has not taken place.

The control means 14 furthermore comprise: a third non-volatile memory 27 containing the size of the boot instructions, and a fourth non-volatile memory 28 containing the storage address of the set of boot instructions in the boot memory 12, and two multiplexers 29 and 30.

The reboot stage 24 is configured for delivering the reboot signal S6 onto the reset pin 20 in response to the reboot command generated by the processing unit 13 and when all the aforementioned reboot conditions are met.

The first memory 25 contains the size of the instructions of the application program APP and the second memory 26 contains the storage address of the application program APP in the memory 11, the processing unit 13 being furthermore configured for storing the size and the address of the application program APP in these two respective memories with a view to a reboot.

The first multiplexer 29 comprises a first input coupled to the third memory 27, a second input coupled to the first memory 25, an output connected to the pin 21 of the processing unit 13 and a control input connected to an output of the reset controller 23.

The second multiplexer 30 comprises a first input coupled to the fourth memory 28, a second input coupled to the second memory 26, an output connected to the pin 22 of the processing unit 13 and a control input connected to the output of the reset controller 23.

The first and second multiplexers 29 and 30 are configured for respectively delivering the contents of the third 27 and fourth memories 28 onto the pins 21 and 22 of the processing unit 13 when the output of the reset controller 23 is in the low "0" state, and for respectively delivering the contents of the first 25 and second 26 memories onto the pins 21 and 22 of the processing unit 13 when the output of the reset controller 23 is in the low "1" state.

In other words, when the integrated circuit IC boots up ("cold" boot), the signals S3 and S4 respectively contain the contents of the third memory 27 and fourth memory 28, and when the processing unit is rebooted 13 ("hot" boot) the signals S3 and S4 respectively contain the contents of the first memory 25 and second memory 26.

The reboot stage 24 comprises a logic circuit 31 configured for receiving the reboot command S2 and for receiving signals corresponding to the reboot conditions and for delivering the reboot signal S6 onto the reset pin 20.

The logic circuit 24 comprises five inputs 32, 33, 34, 35 and 36 connected to the bus 16, and an output 37 connected to the pin 20.

The input 36 is connected to the reset controller 23 and the input 32 receives the boot command S2.

The signal S5 is at "1" by default when no interruption of the processing unit 13 is requested by the reset controller.

Signals S33, S34 and S35 respectively flow into the inputs 33, 34 and 35.

The signal S35 is at "0" when no instruction is transferred over the bus 16 and at "1" in the opposite case.

The signal S34 is at "1" when the cache memory 15 is empty and at "o" in the opposite case.

The signal S33 is at "1" when the processing core 15a does not execute any instruction and at "0" in the opposite case.

The logic circuit 31 comprises an inverter 38, a NAND logic gate 39, a means for increasing the pulse width of a clock signal 40 ("pulse stretcher") and an AND logic gate 41.

The input 35 is connected to the input of the inverter 38, the output of the inverter 38 being connected to one input of the NAND logic gate 39.

The inputs 32, 33 and 34 are each connected to a different input of the NAND logic gate 39.

The output of the NAND logic gate 39 is connected to an input of the means 40 for increasing the pulse width of a clock signal.

An output from the means 40 is connected to a first input of the AND logic gate 41, the input 36 is connected to a second input of the AND logic gate 41 and an output of the AND logic gate 41 is connected to the output 37.

In the following, the same alpha-numeric references denote the same elements.

Figure 3:
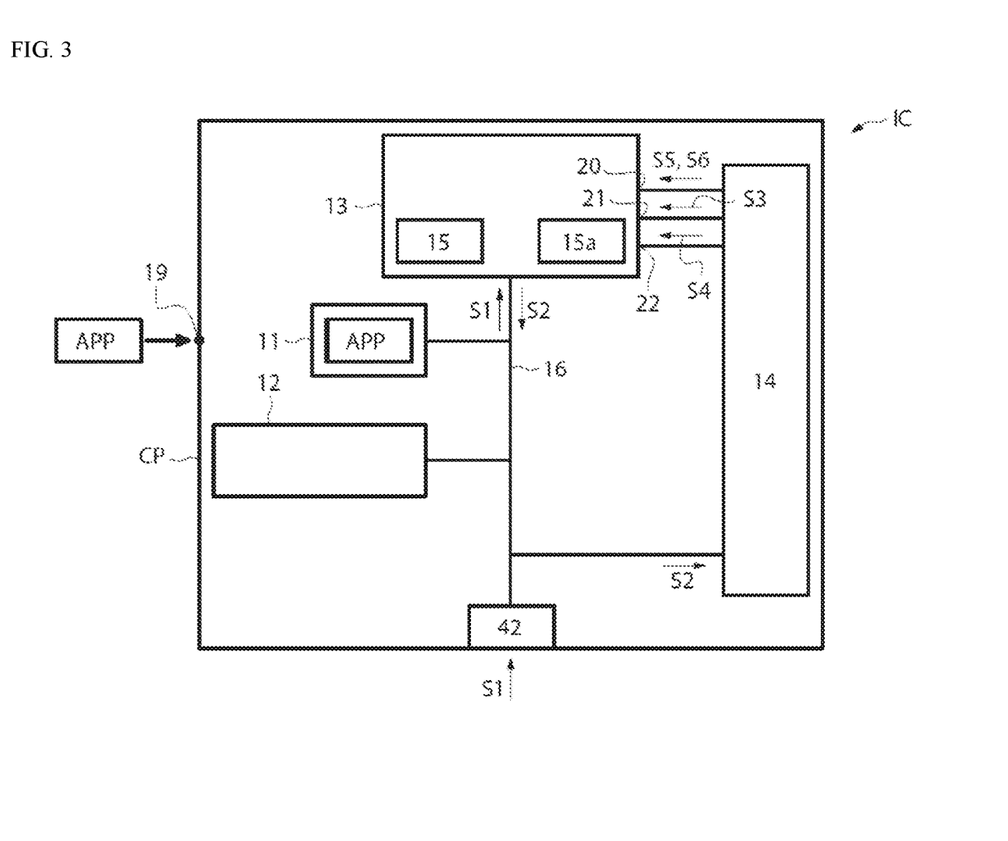

FIG. 3 illustrates one example of a second embodiment of the integrated circuit IC.

This again shows the program memory 11, the boot memory means 12, the processing unit 13, the control means 14 and the bus 16.

This embodiment differs from the embodiment illustrated in FIG. 1 in that a communications interface 42 is connected to the bus 16 and configured for receiving the selection signal S1.

The selection signal S1 may for example be communicated by the user of the System-on-a-Chip.

Figure 4:
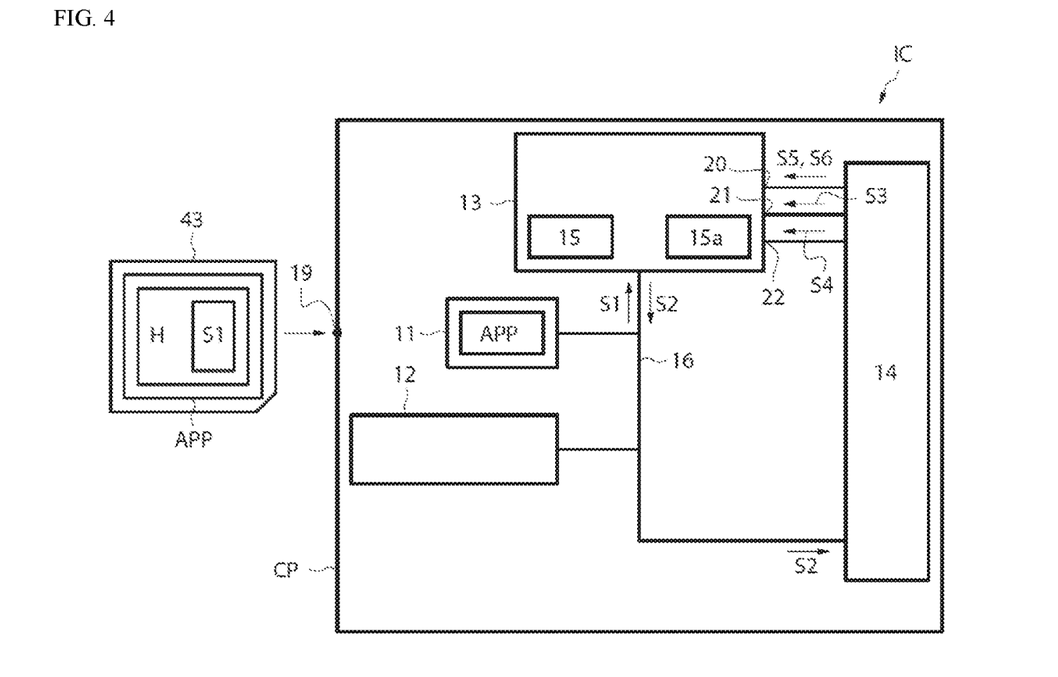

FIG. 4 illustrates one example of a third embodiment of the integrated circuit IC.

This again includes the program memory 11, the boot memory means 12, the processing unit 13, the control means 14 and the bus 16.

This embodiment differs from the embodiment illustrated in FIG. 1 in that the application program APP comprises a header H forming the selection signal S1, the application program APP being stored in a memory external to the integrated circuit IC, for example an SD card 43.

When the application program APP is copied into the program memory 11, the processing unit 13 reads the header H of the application program APP forming the selection signal S1.

Figure 5:
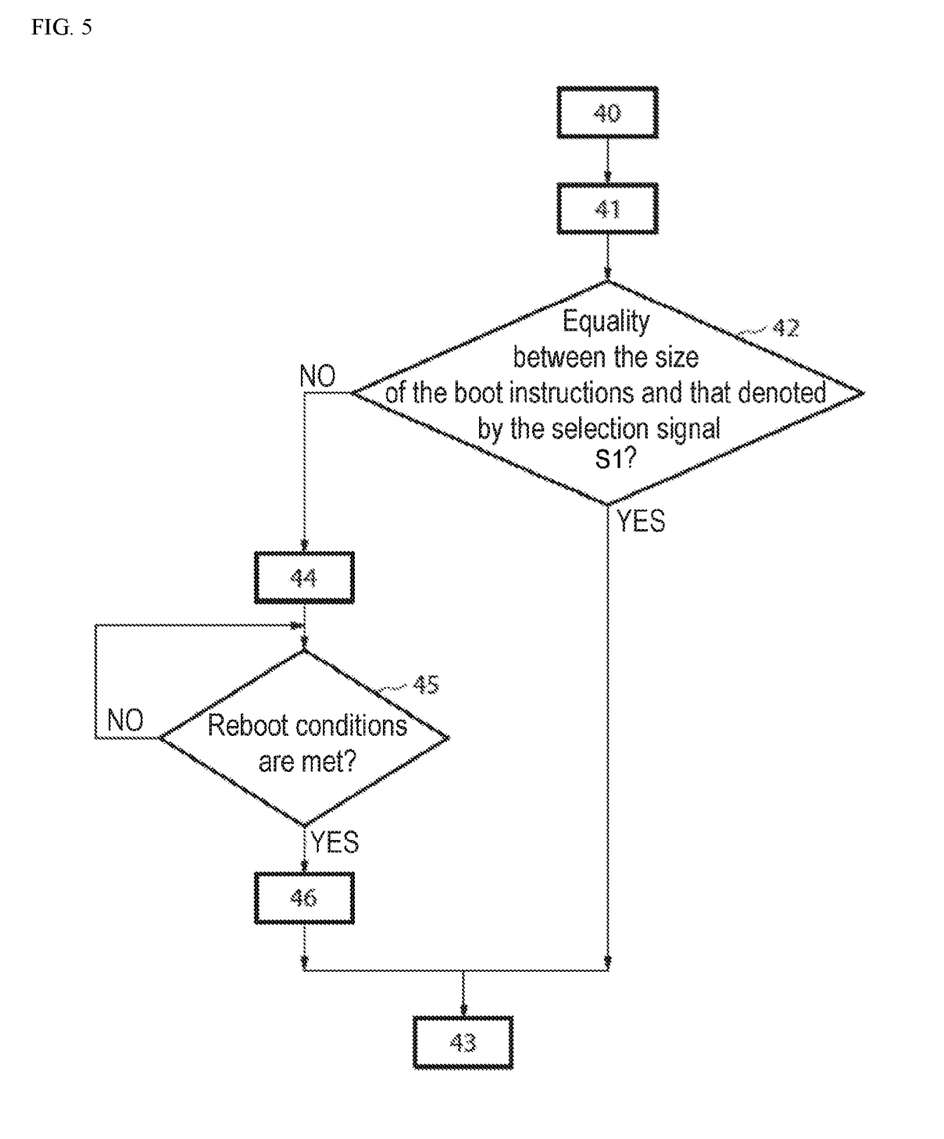

Reference is made to FIG. 5 which illustrates a first exemplary embodiment of the integrated circuit IC.

In a step 40, the reset controller 23 boots up the System-on-a-Chip IC, notably the processing unit 13.

The signals S3 and S4 respectively comprise the contents of the third 27 and fourth memories 28 such that the processing unit 13 boots up with the boot instructions contained in the memory means 12.

The application program APP is loaded into the memory 11.

Then, for example during a step 41, the selection signal S1 is delivered to the processing unit 13.

If the integrated circuit IC comprises the auxiliary memory 18, the processing unit 13 reads, in this memory 18, the digital word M1 representing the selection signal S1.

If the integrated circuit IC comprises the communications interface 42, the processing unit 13 reads the selection signal S1 via the said interface.

If the application program APP comprises the header H and the communications interface, when it is copied, the processing unit 13 determines the selection signal S1 based on the header H.

In the step 42, the processing unit 13 compares the size indicated in the selection signal S1 with the size of the boot instructions.

If the size of the boot instructions and that denoted by the selection signal S1 are equal, the processing unit 13 executes the application program APP coded with the instructions having the said denoted size (step 43).

If the reference size denoted by the selection signal S1 is different from the default size of the boot instructions, in the step 44, the processing unit stores the size of the instructions of the application program APP and the address of the application program APP in the memory 11, respectively in the first 25 and second 26 memories. Then, the processing unit 13 generates the reboot command S2.

If, at the step 45, all the reboot conditions are met, in other words if no data is being transferred over the bus 16, if the cache memory 15 is empty, and if the processing unit 13 is not carrying out any operation, the method continues with the step 46.

During the step 46, the reboot stage 24 delivers: the signal S6 onto the reset pin 20, the signal S3 (comprising the content of the first memory 25) onto the pin 21, and the signal S4 (comprising the content of the second memory 26) onto the pin 22.

The processing unit 13 reboots with the instructions of the application program APP having a size equal to the denoted reference size.

Then, the method continues at the step 43.

If, at the step 45, the reboot conditions are not met, the method waits until the reboot conditions are met.

Figure 6:
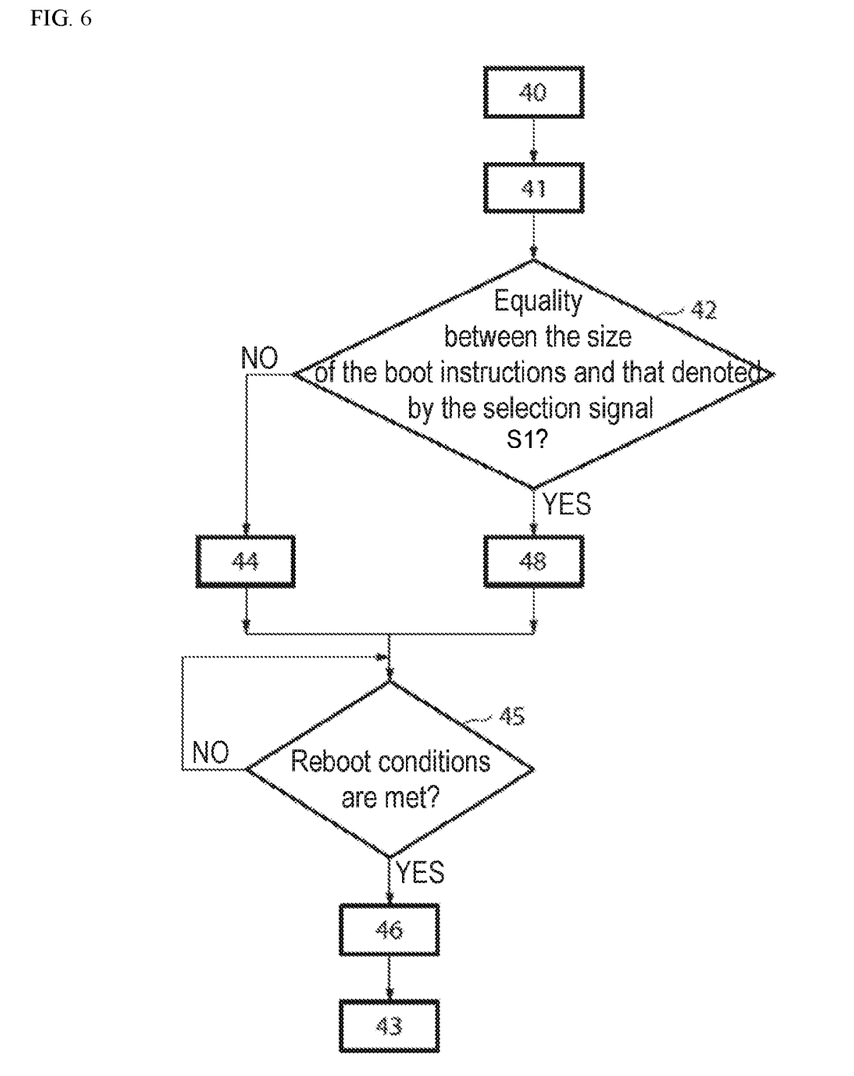

Reference is made to FIG. 6 which illustrates a second exemplary embodiment of the integrated circuit IC.

This again includes the steps 40, 41, 42, 43, 44, 45 and 46.

This embodiment differs from the first exemplary embodiment illustrated in FIG. 5 in that, even if in the step 42 the reference sizes of the boot instructions and that denoted by the selection signal S1 are equal, in the step 48, the processing unit 13 stores the size of the instructions of the application program APP and the address of the application program APP in the memory 11, in respectively the first 25 and second 26 memories, then generates the reboot command S2 such that the processing unit 13 reboots with the instructions of the application program APP.

If, in the step 45, all the reboot conditions are met, in other words if no data is being transferred over the bus 16, if the cache memory 15 is empty, and if the processing unit 13 is not carrying out any operation, the method continues at the step 46, then at the step 43.

It goes without saying that the method described hereinabove with the processing unit 13 associated with the cache memory 15 is also applicable in the case where a cache memory is not present, the condition on the inactive cache memory not being applicable.

What is claimed is:

1. A method for operating a processing unit configured to execute an application program capable of being coded with instructions having different reference sizes, the method comprising:
    booting up the processing unit with a set of boot instructions having a first reference size of the reference sizes;
    delivering, to the processing unit, a selection signal denoting a second reference size of the instructions of the application program, the selection signal external to the instructions of the application program;
    in response to the second reference size denoted by the selection signal being different from the first reference size of the boot instructions:
        generating, by the processing unit, a reboot command; and
        reconfiguring and rebooting the processing unit with the instructions of the application program, based on the reboot command; and
    executing, by the processing unit, the instructions of the application program.

2. The method according to claim 1, wherein the processing unit is connected to a bus, and the reconfiguring and rebooting of the processing unit are performed in response to the reboot command and to both of the following conditions being met:
    no data is being transferred over the bus, and
    the processing unit is not executing any operation.

3. The method according to claim 2, wherein the processing unit is associated with a cache memory, and the rebooting of the processing unit is performed further in response to the cache memory being inactive.

4. The method according to claim 1, further comprising:
    delivering, to the processing unit, a second selection signal denoting a third reference size of the instructions of the application program; and
    in response to the third reference size denoted by the second selection signal being the same as the first reference size of the boot instructions:
        executing, by the processing unit, the instructions of the application program without rebooting the processing unit.

5. The method according to claim 1, wherein the selection signal comprises a digital word or a header of the application program.

6. The method according to claim 1, wherein the application program is capable of being coded with instructions having two different reference sizes.

7. The method according to claim 6, wherein the two different reference sizes are respectively equal to 32 bits and 64 bits.

8. An integrated circuit comprising:
    a program memory configured to store an application program capable of being coded with instructions having different reference sizes;
    a boot memory configured to store a set of boot instructions having a first reference size of the reference sizes;
    a processing unit configured to execute the application program and to receive a selection signal denoting a second reference size of the instructions of the application program, wherein the selection signal is external to the instructions of the application program; and
    a control unit configured to boot up the processing unit with the set of boot instructions, and, in response to the second reference size denoted by the selection signal being different from the first reference size of the boot instructions:
        receive a reboot command from the processing unit; and
        reconfigure and reboot the processing unit with the instructions of the application program, based on the reboot command, in order for the processing unit to execute the instructions of the application program having the second reference size.

9. The integrated circuit according to claim 8, further comprising a bus connected to the processing unit, wherein the control unit is configured to reconfigure and reboot the processing unit in order for the processing unit to execute the instructions of the application program in response to the reboot command generated by the processing unit and in response to both the following conditions being met:
    no data is being transferred over the bus, and
    the processing unit is not executing any operation.

10. The integrated circuit according to claim 8, wherein the processing unit is further configured to execute the application program without a prior reboot, in response to the second reference size denoted by the selection signal being the same as the first reference size of the boot instructions.

11. The integrated circuit according to claim 8, further comprising a bus connected to the processing unit, wherein the control unit is configured to reconfigure and reboot the processing unit in order for the processing unit to execute the instructions of the application program, in response to the second reference size denoted by the selection signal being the same as the first reference size of the boot instructions, in response to the reboot command generated by the processing unit and in response both the following conditions being met:
    no data is being transferred over the bus, and
    the processing unit is not executing any operation.

12. The integrated circuit according to claim 9, further comprising a cache memory associated with the processing unit, wherein the control unit is configured to reconfigure and reboot the processing unit further in response to the cache memory being inactive.

13. The integrated circuit according to claim 8, wherein the processing unit comprises a reset pin, and wherein the control unit comprises a reset controller configured to deliver a boot signal onto the reset pin so as to boot up the processing unit with the set of boot instructions.

14. The integrated circuit according to claim 9, wherein the processing unit comprises a reset pin, and wherein the control unit comprises:
  a reset controller configured to deliver a boot signal onto the reset pin so as to boot up the processing unit with the set of boot instructions; and
  a reboot stage configured to deliver a reboot signal onto the reset pin in response to the reboot command generated by the processing unit and in response to the conditions being met.

15. The integrated circuit according to claim 14, wherein the reboot stage comprises a logic circuit configured to receive the reboot command and input signals corresponding to the conditions, and to deliver the reboot signal onto the reset pin.

16. The integrated circuit according to claim 8, wherein the control unit is configured to deliver, to the processing unit during a reboot, a first indication representative of the second reference size denoted and a second indication representative of a storage address of the instructions of the application program.

17. The integrated circuit according to claim 16, wherein the control unit comprises a first memory one-time-writable after each reboot to store the first indication, and a second memory to store the second indication, and wherein the processing unit is configured to store the first and second indications in the respective first and second memories in response to each reboot.

18. The integrated circuit according to claim 8, further comprising an auxiliary memory configured to store a digital word representing the selection signal.

19. The integrated circuit according to claim 8, wherein the processing unit is configured to read a header of the application program indicating the selection signal.

20. The integrated circuit according to claim 8, further comprising a communications interface configured to receive the selection signal.

21. The integrated circuit according to claim 8, wherein the application program is capable of being coded with instructions having two different reference sizes.

22. The integrated circuit according to claim 21, wherein the two different reference sizes are respectively equal to 32 bits and 64 bits.

* * * * *